Aug. 29, 1944. F. KAUTZ Re. 22,538

SHELF BRACKET SUPPORT FOR ADJUSTABLE AND RELEASABLE SHELVING

Original Filed Aug. 7, 1941 2 Sheets-Sheet 1

INVENTOR.

Frederick Kautz

Aug. 29, 1944. F. KAUTZ Re. 22,538

SHELF BRACKET SUPPORT FOR ADJUSTABLE AND RELEASABLE SHELVING

Original Filed Aug. 7, 1941 2 Sheets-Sheet 2

INVENTOR.

Frederick Kautz

Reissued Aug. 29, 1944

Re. 22,538

UNITED STATES PATENT OFFICE 22,538

SHELF BRACKET SUPPORT FOR ADJUSTABLE and RELEASABLE SHELVING

Frederick Kautz, Philadelphia, Pa.

Original No. 2,319,237, dated May 18, 1943, Serial No. 405,872, August 7, 1941. Application for reissue May 12, 1944, Serial No. 535,333

14 Claims. (Cl. 248—235)

This invention relates to shelving and more particularly to support thereof, and it consists in the constructions, arrangements and combinations herein described and claimed.

It is a particular object of the invention to provide shelf supporting seats in superposed, spaced relation, pairs of the seats cooperating for support and detachable retention of respective shelf brackets.

It is also an object of the invention to provide seat structures which may be readily secured to a stud by simple welding operations, the seat being of such contour as to function in a manner to afford support of superposed shelving.

It is a further object of the invention to provide a seat and shelf structure having interengaging means for simultaneously securing the parts together in assembled relation and hold the shelf against displacement.

A still further object of the invention is to provide a seat structure in which the shelf is held firmly against sidewise displacement.

It is a further object of the invention to provide a seat structure constructed so as to support shelf bracket arms upon opposite sides of a studding.

It is a still further object of the invention to provide a seat structure which will afford full support of a shelf bracket at its load sustaining end and having means permitting manual release of the bracket from the seat.

Additional objects, advantages and features of invention will be apparent from the following description considered in conjunction with the accompanying drawings, wherein, Figure 1 is a fragmentary perspective view illustrating a shelf seat installed upon a stud and showing portion of shelving supported by the seats.

Figure 1:
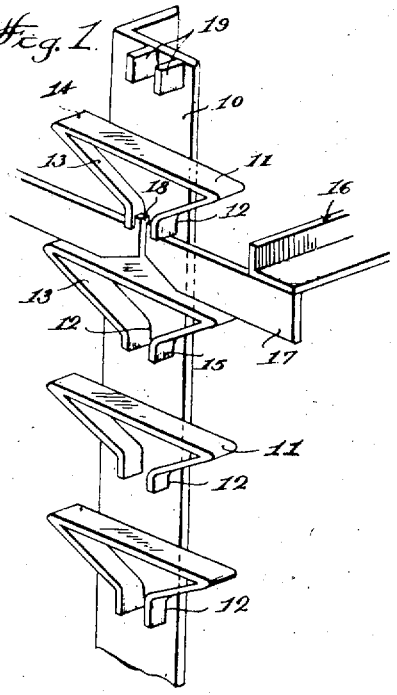

While I have illustrated numerous forms of the invention, it will be apparent that the essential features of the invention reside in an upright support having shelf seats arranged in superposed spaced relation, the seats being so positioned and constructed that a shelf bracket may be interposed between portions of a pair of the seats for retention of the shelf bracket.

Referring to the drawings, certain of the figures illustrate an upright support upon which the seats and shelves are secured, but it will be understood that in actual practice, a plurality of supports will be employed arranged in a row at spaced intervals, the number of such supports depending upon the length or number of the shelves to be sustained.

In Figure 1, there is illustrated an upright angle stud 10 having a plurality of shelf bracket seats 11 secured thereto, preferably by welding, as indicated at 12.

The bracket seats are formed from a continuous flat strip bar, bent inwardly of respective ends to present angularly disposed extensions 13 beneath the planiform face 14, the extensions each terminating in lugs 15 spaced apart for a purpose presently to be explained. The bracket seats are secured to the upright 10 at spaced intervals, vertically of the upright, the spacing depending upon the width of the bracket of the shelf to be supported. The brackets 11 are secured to the upright so that the planiform face 14 is horizontally disposed with the extensions 13 downwardly presented snug against the upright. The lugs 15 are disposed at an angle to the extensions so as to lie in a plane parallel to the vertical plane of the upright and to respective sides thereof.

A portion of shelf 16 is shown having a support arm 17, the free end of which is provided with an upstanding nib 18. The arm 17 is of a width equal to the distance between the planiform face 14 of one seat to the downwardly presented lugs 15 of the seat next above.

To install the shelving to uprights it is only necessary to present the arms 17 to the faces 14 and lift the front edge of the shelf so that the nibs 18 may pass beneath the lugs 15. The shelf may be allowed to come to rest upon the face when the nibs 18 will firmly contact the lugs 15. The arms 17 of the shelf will be so spaced as to lie flat against the support 10 to prevent endwise movement and the faces 14 of the seats are of such length as to project substantial distances beyond the vertical edges of the upright, affording ample support to the shelf arm.

From the foregoing, it will be seen that the shelving will be securely locked to the supporting structure against accidental withdrawal, yet the shelving may be manually released when desired by merely elevating the front end of the shelf so that the nibs may pass beneath the lugs.

The nibs 18 are preferably formed upon the arms by welding small slugs thereto, it being found that this is less costly than forming the nibs integrally with the arms, although the latter practice may be followed if desired.

At the uppermost portion of the uprights 10, a pair of auxiliary lugs 19 are secured, by welding, vertically aligned with the lugs 15, and cooperate with the uppermost shelf seat for support of a shelf when desired.

By the construction presented it will be apparent that the main strain exerted upon a shelf will be absorbed between the planiform face 14 and the lugs 15 and since the extensions 13 from the lugs are angularly disposed great reinforcement to the shelf seats are involved, and this is further augmented since the thrust of the load is along a line longitudinally of the lugs 15.

The lugs 15 of the seats are spaced apart in order to accommodate shelf arms when they are presented from opposite sides of the support, as will be apparent.

Figure 2:
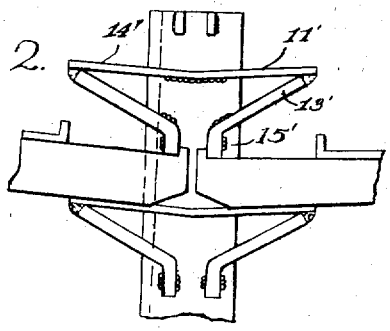
Figure 2 is an end view of a modification of the seat formation.

The structure of Figure 2 is similar to that of Figure 1, except that the shelf seat 11' is formed of three separate strips 13' and 14' being welded at their points of contact. Also the strip 14' is given a slight angular bend at its medial portion and is of lesser thickness than the diagonal strips 13' and the lugs 15'. Since the strips 13' will support the main strains and stresses, this construction permits the construction of extra strong bracket seats, and at a saving in material.

Figure 3:
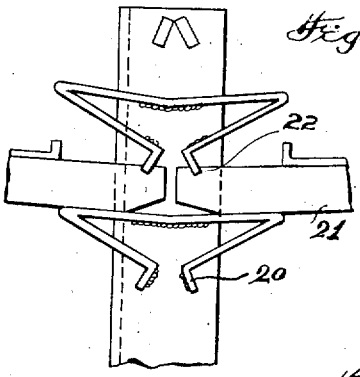
Figure 3 is a similar view of a further form of the seat.

In Figure 3 the lugs 20 are shown in a diverging angular manner, thereby being disposed in oblique relation to the support. In this instance, the shelf arms 21 will be devoid of nibs and in their stead an angular notch 22 will be formed in the arms to accommodate the lugs.

Figure 4:
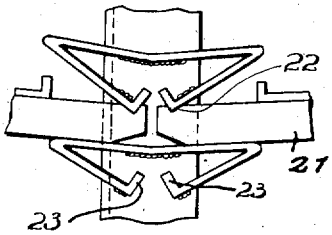
Figure 4 is a view illustrating a modification of the seat shown in Figure 3.

In Figure 4 the lugs 23 are reversely formed with respect to those shown in Figure 3, presenting a V-shaped lug formation, and the shelf arms 21 will therefore be formed with a correspondingly shaped notch 22 as in Figure 3.

Figure 5:
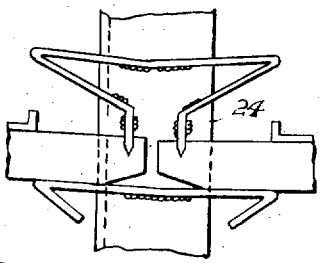
Figure 5 is an end elevation of a further form of the seat structure.

The form shown in Figure 5 provides triangular terminations 24 to the lugs complemental to similarly shaped notches formed in the shelf arms.

Figure 6:
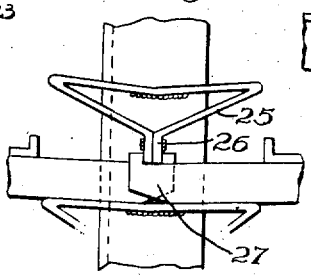
Figures 6 and 7 are end elevations illustrating further forms of the seat.
Figure 7:
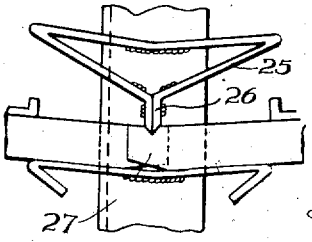

In Figures 6 and 7 the diagonal arms 25 converge to such extent that the lugs 26 are brought into mutual contacting engagement at a vertical axis of the support member. The ends of the lugs 26 of Figure 6 are shown as square to accommodate a shelf arm as in Figure 1, while the lugs of Figure 7 are triangularly shaped. In the use of these forms of seats, the shelf arms 27 extended from opposite sides are overlapped as shown.

Figure 8:
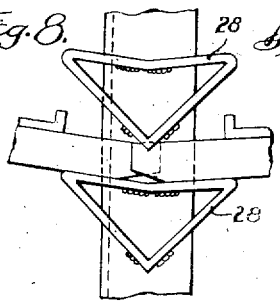
Figure 8 is an end elevation of a still further form of shelf seat.

In Figure 8, the shelf seat 28 is formed substantially in the form of a triangle, the vertex of which forms the anchor lug for engaging a shelf, as in Figure 7.

Figure 9:
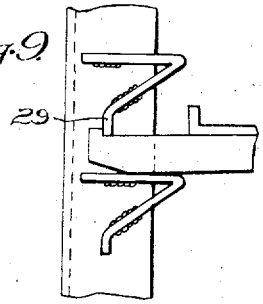
Figure 9 illustrates a construction of a seat for support of a shelf upon one side of a studding.
Figure 10:
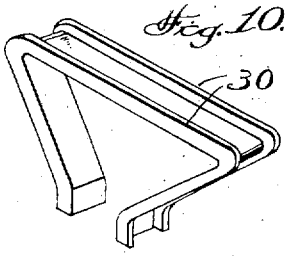
Figure 10 is a perspective view of a modification of the seat illustrated in Figure 1.

In such cases where shelving is required only upon one side of the support members, the structure of Figure 9 may be followed. In this instance a single anchor lug 29 is required, and it will be noted that the shelf seat is in reality, but one-half of the seat illustrated in Figure 1.

Where greater strength and rigidity is required in the shelf seats, these may be formed from channel bar stock with flanges 30 presented in outward direction as shown in Figure 10. The flanges 30 serve also as guards against sidewise dislocation of the shelf.

Figure 11:
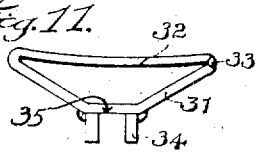
Figure 11 is a side elevation of a further construction of a shelf seat.

In Figure 11 the shelf seat is formed from a single strip of metal bent to a desired shape so that one diverging arm 31 contacts and is welded to the face plate 32 as at 33. The lugs 34 in this instance, are welded to a bridge portion 35 of the seat.

Figure 12:
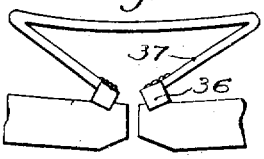
Figures 12 and 13 are end elevations of seat structures, employing angular anchor lugs, being modifications of the forms shown in Figures 5 and 7.
Figure 13:
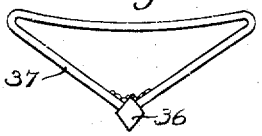

The structures of Figures 12 and 13 provide for anchor lugs having greater contacting areas than is provided in the previous forms described. In these instances angular bar members 36 are welded to the extremities of the diverging arms 37.

Figure 14:
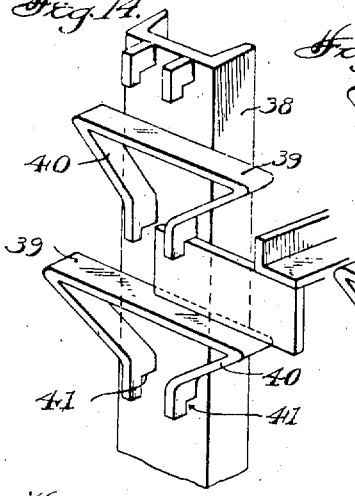
Figure 14 is a fragmentary perspective view illustrating a modified form of that shown in Figure 1.

A channel beam 38 is illustrated in Figure 14, as the upright support, the shelf seats 39 being similar to those shown in Figure 1, but in addition, the diverging arms 40 are formed with notches 41 next adjacent to the beam for accommodation of the shelf arm flat against the beam. This arrangement eliminates sidewise movement of the shelf.

Figure 15:
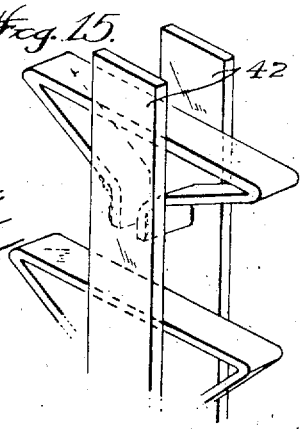
Figures 15 and 16 are fragmentary perspective views illustrating the application of modified forms of seats as installed between opposed studs or supports.
Figure 16:
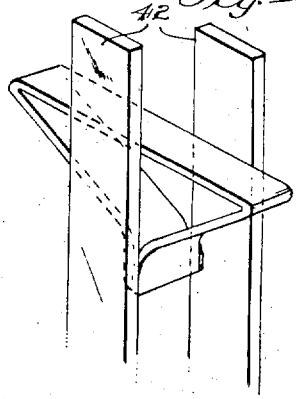

The structures of Figures 15 and 16 embody opposed flat bars 42 as the support member, with the shelf seats interposed and fixed therebetween. In Figure 15 the bars 42 are shown as directly opposite one another, while in Figure 16 the bars 42 are in shifted transverse positions.

Figure 17:
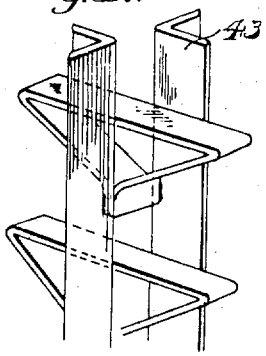
Figure 17 is a fragmentary perspective view illustrating a form of seat as installed between two angular support or stud members.

Angle bars 43 may be employed as the supporting member shown in Figure 17.

Figure 18:
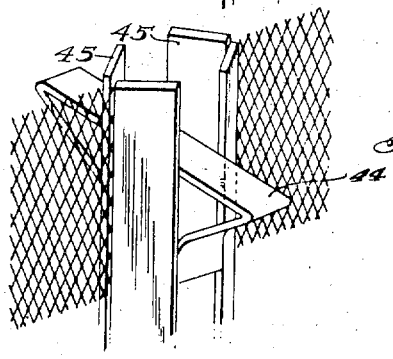
Figure 18 is a fragmentary perspective view illustrating an application of seats between the framing of screen panels.

In Figure 18 there is shown an example of the adaption of shelf seats 44 between frame members 45 of screen panels.

In Figures 2 to 9 and 11 to 13 the planiform portion of the seats have their outer edges slightly higher than the medial portion forming a dihedral angle, functioning to reinforce the seats, as well as to counteract any tendency of the shelves to sag.

While I have shown and specifically described the various constructions of the invention, this is by way of illustration only, and I consider as my own all such modifications in structure as fairly fall within the scope of the appended claims.

I claim:

1. In a support for shelving, an upright support element, seat members fixed to the support element above each other, each seat member having a portion located transversely to the upright support element and having a downwardly extended portion stopping short of the seat member immediately therebelow, said transverse portion being of a length so as to extend beyond an upright edge of the support element, the terminal of said downwardly extended portion being located directly at the support element, and a shelf portion positioned upon one seat, of a height to engage the downwardly extended portion of the next adjacent seat.

2. In a support for shelving, an upright support element, seat members fixed to the support element above each other, each seat member having a portion located transversely to the upright support element and having a pair of downwardly extended portions stopping short of the seat member immediately therebelow, said transverse portion being of a length so as to extend beyond opposite upright edges of the support element, the terminal of said downwardly extended portions being located directly at the support element, a pair of shelf arms adapted to be inserted from opposite sides of the support element for seating engagement with one of the seat members, and being of a height to engage respective downwardly extended portions.

3. In a support for shelving, an upright support element, seat members fixed to the support element above each other, each seat member comprising shaped stock material having a substantially horizontal portion located transversely to the upright support element and further having a downwardly extended portion stopping short of the seat member immediately therebelow, said downwardly extended portion being pivoted on the outer part of said transverse portion and disposed in substantially acute angular relation thereto, and a shelf portion positioned upon one seat, of a height to engage the downwardly extended portion of the next adjacent seat.

4. In a support for shelving, an upright support element, seat members fixed to the support element above each other, each seat member comprising shaped stock material having a substantial width and a narrow thickness including a portion located transversely to the upright support element and further having a downwardly extended portion stopping short of the seat member immediately therebelow, the width of said stock material being placed in a plane at right angle to the upright support element, and a shelf portion positioned upon one seat, of a height to engage the downwardly extended portion of the next adjacent seat.

5. In a support for shelving, an upright support element, seat members fixed to the support element above each other, each seat member consisting of separate pieces of stock material arranged and secured to provide a portion located transversely to the upright support element and a downwardly located portion stopping short of the seat member immediately therebelow, said downwardly extended portion being of a thickness greater than the transversely located portion, and a shelf portion positioned upon one seat, of a height to engage the downwardly extended portion of the next adjacent seat.

6. In a support for shelving, an upright support element, seat members fixed to the support element above each other, each seat member having a portion located transversely to the upright support element and having a downwardly extended portion stopping short of the seat member immediately therebelow, said transverse portion having upwardly directed lateral extensions with a planiform portion therebetween, and a shelf portion positioned upon the planiform portion of one seat, of a height to engage the downwardly extended portion of the next adjacent seat.

7. In a support for shelving, an upright support element, seat members fixed to the support element above each other, each seat member having a portion located transversely to the upright support element and having a downwardly extended portion stopping short of the seat member immediately therebelow, said seat members being of a length so as to extend beyond the upright edges of the support element and having a slight inclination in an upward direction from a point adjacent the longitudinal axis of the support element, and a shelf portion positioned upon one seat, of a height to engage the downwardly extended portion of the next adjacent seat.

8. The structure of claim 1 in which the downwardly extended portion includes a lug positioned in a plane parallel to the longitudinal axis of the support element.

9. The structure of claim 1 in which the downwardly extended portion includes a lug positioned in a plane at an angle to the longitudinal axis of the support element.

10. The structure of claim 1 in which the shelf portion is engaged with the downwardly extended portion of respective seat member by interlocking means consisting of a pointed lug and a complemental substantially triangular recess.

11. In a support for shelving, an upright support member having a flat face, seat members fixed to the face above each other, each seat having a pair of spaced downwardly extended portions stopping short of the seat member immediately therebelow, a pair of shelf arms adapted to be inserted from opposite horizontal sides of the support member for seating engagement with one of the seat members, said arms lying in proximity to the flat face of the support member, and being of a height to engage respective downwardly extended portions, and inter-locking means between the arms and downwardly extended portions.

12. In a support for shelving, an upright support member having a flat face, seat members fixed to the face above each other, each seat comprising a substantially horizontal planiform portion and a pair of spaced downwardly extended portions positioned adjacent to the longitudinal axis of the support member, the downwardly extended portions stopping short of the seat member immediately therebelow, a pair of shelf arms adapted to be inserted from opposite horizontal sides of the support member for seating engagement with the horizontal planiform portion of one of the seat members, said arms lying in proximity to the flat face of the support member, and being of a height to engage respective downwardly extended portions, and inter-locking means between the arms and the downwardly extended portions.

13. In a support for shelving, a pair of spaced upright members having opposed faces, vertically spaced seat members fixed between the faces of the upright members, each seat having a portion transverse of the upright members, said transverse portion being of a length so as to extend beyond the vertical edges of the upright members, each seat member having a downwardly extended portion stopping short of the seat member immediately therebelow, and a shelf portion positioned upon the transverse portion of one seat, of a height to engage the downwardly extended portion of the next adjacent seat.

14. In a support for shelving, an upright support member, seat members fixed to a side of the support member above each other, each seat member comprising shaped stock material having a substantially horizontal portion located transversely to the upright member and a downwardly extended supporting brace portion terminating in a lug member spaced apart from the upright support member, said downwardly extended portion stopping short of the seat member immediately therebelow at a location adjacent to the upright support member and having said lug member further downwardly extended therefrom, and a shelf portion positioned upon one seat, of a height to engage the downwardly extended portion of the next adjacent seat.

FREDERICK KAUTZ.